United States Patent [19]

Lambson

[11] 4,239,057
[45] Dec. 16, 1980

[54] PRESSURE CONTROL VALVE

[76] Inventor: Robert A. Frosch, Administrator of the National Aeronautics and Space Administration, with respect to an invention of Kenneth H. Lambson, Salt Lake City, Utah

[21] Appl. No.: 57,465

[22] Filed: Jul. 13, 1979

[51] Int. Cl.³ .......................... E03B 3/18; F16K 31/58
[52] U.S. Cl. .................................. 137/549; 251/339; 251/216; 128/DIG. 20; 137/886; 137/887
[58] Field of Search ............... 137/561 R, 886, 887, 137/549; 251/216, 217, 145, 339; 128/89 R, DIG. 20

[56] References Cited

U.S. PATENT DOCUMENTS

| | | | |
|---|---|---|---|
| 1,782,758 | 11/1930 | Gavin | 137/549 |
| 3,008,686 | 11/1961 | Becker | 251/339 |
| 3,145,731 | 8/1964 | Kaatz et al. | 137/549 |
| 3,360,007 | 12/1967 | Haidek et al. | 251/65 |
| 3,811,006 | 5/1974 | Burnell et al. | 251/145 |
| 4,014,365 | 3/1977 | Peterson et al. | 137/549 |

FOREIGN PATENT DOCUMENTS

| | | | |
|---|---|---|---|
| 869476 | 5/1961 | United Kingdom | 251/216 |
| 907495 | 10/1962 | United Kingdom | 251/145 |

*Primary Examiner*—Martin P. Schwadron
*Assistant Examiner*—A. Michael Chambers
*Attorney, Agent, or Firm*—Darrell G. Brekke; John R. Manning

[57] ABSTRACT

A control valve is provided which is adapted to be connected between a pressure source, such as vacuum pump, and a pressure vessel so as to control the pressure in the vessel. The valve comprises a housing having a longitudinal bore therethrough which is connected between the pump and vessel, and a transversely movable valve body which controls the air flow through an air inlet in the housing. The valve body includes cylindrical and conical shaped portions which cooperates with reciprocally shaped portions of the housing to provide flow control. A filter disposed in the air inlet filters out foreign matter in the air. The bottom end of the valve body screws into the valve housing control knob formed integrally with the valve body controls translation of the valve body and hence opening and closing of the valve.

3 Claims, 2 Drawing Figures

PRESSURE CONTROL VALVE

Origin

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS REFERENCE TO RELATED APPLICATION

This application discloses subject matter in common with concurrently filed, copending application Ser. No. 057526 entitled SPINE IMMOBILIZATION METHOD AND APPARATUS.

FIELD OF THE INVENTION

The invention relates to adjustable control valves and, in particular, to adjustable control valves adapted to be connected between a pressure vessel and a pressure source so as to control the pressure in the vessel.

BACKGROUND OF THE INVENTION

As explained in more detail hereinbelow, the control valve of the invention is particularly adapted for use in controlling the pressure within a flexible bladder used in immobilizing the spine of an accident victim. The bladder is adapted to be made rigid and hence support the spine when the pressure therein is reduced below ambient through means of a suction pump and provides a number of special advantages when so used. However, it should be noted that the control valve of the invention is not limited to such a use and, moreover, may be employed in arrangements utilizing either negative or positive pressure.

A number of different control arrangements and like devices have been used in pressure control and, in particular, controlling the suction or vacuum pressure produced by a suction pump or similar device. Examples of such devices are disclosed in U.S. Pat. Nos. 3,039,463 (Dickey, Jr. et al); 2,830,260 (Del Chiocca); 3,595,234 (Jackson) and 3,360,007 (Haidek et al). The Dickey, Jr. et al patent discloses a suction control device wherein a sleeve having a T-slot therein is adjusted to permit outside air into a tube so as to vary the suction force without adjusting the vacuum pump. The Del Chiocca patent discloses a valve assembly wherein air enters through the valve stem of a "T" valve and control of the air flow is effected by screwing the valve in and out. The Jackson patent discloses a vacuum control assembly for a medicosurgical suction tube wherein a band which slides over an opening in the valve so as to adjust the vacuum force in the tube. The Haidek et al patent discloses a gas pressure and vacuum pull control valve providing lateral screw adjustment of the in-line gas pressure. Other patents of possible interest include U.S. Pat. Nos. 1,092,043 (Hammond) and 2,176,139 (Lofgren).

SUMMARY OF THE INVENTION

In accordance with the invention, a control valve is provided which is adapted to be connected between a pressure vessel (e.g. the rigidifiable bladder referred to above) and a pressure source (e.g. a vacuum pump) so as to control the pressure in the vessel. The control valve comprises a valve housing having a bore therethrough which is adapted to be connected in a line between the source and vessel, at least one air inlet formed in the housing having a filter disposed therein for filtering the air passing through the air inlet and an adjustable valve body or valve stem which controls opening and closing of a passage between the air inlet and the bore in the housing and thus controls the pressure in the line.

According to a preferred embodiment, the valve body is mounted for movement orthogonal to the bore and includes a conical surface which mates with an internal conical surface of the housing to block the air flow. A primary sealing member, in the form of a sealing ring which engages the conical portion of the valve body, provides an air-tight seal. The valve body also includes a cylindrical portion which controls the amount of the filter media exposed to communication with the passage provided between the conical mating surfaces referred to above when the valve body is moved from the closed position thereof.

The valve body further comprises a further cylindrical portion the free end of which is threadably received in the housing, and a control knob formed integrally with the first mentioned cylindrical portion at the other end of the valve body provides for rotation of the valve body and hence translation thereof as the threaded portion is screwed and unscrewed.

The further cylindrical portion of the valve body preferably includes a second threaded portion which is normally spaced from and disengaged from a correspondingly threaded aperture in the housing through which a portion of the valve body extends. This second threaded portion prevents the valve body from separating from the housing when the first threaded portion is completely unscrewed. Thus, the valve body can be removed only by also unscrewing the second threaded portion.

Advantageously, a further sealing member is provided in a groove in the housing disposed adjacent to the internal surface of the control knob in facing relationship thereto, the further sealing member frictionally engaging the control knob and serving to assist in fixing the position of the knob.

Preferably, the threaded end of the valve member is received in an insert in the housing which is placed in an opening in the housing during assembly of the valve, this arrangement facilitating the assembly of the valve.

The filtering media provided is disposed so that all of the inlet air flows therethrough and ensures that the inlet air is free of particulate matter. This may be of particular importance where the valve is incorporated in a spine immobilization system such as described above since such as system is intended for use in emergency rescues and thus should be operational at all times. The filtering provided will prevent particulate matter such as mud, ashes and the like from fouling the system. As discussed below, the valve of the invention also provides additional advantages in such a system.

Other features and advantages of the invention will be set forth in, or apparent from, the detailed description of a preferred embodiment found hereinbelow.

DESCRIPTION OF A PREFERRED EMBODIMENT

Figure 1:
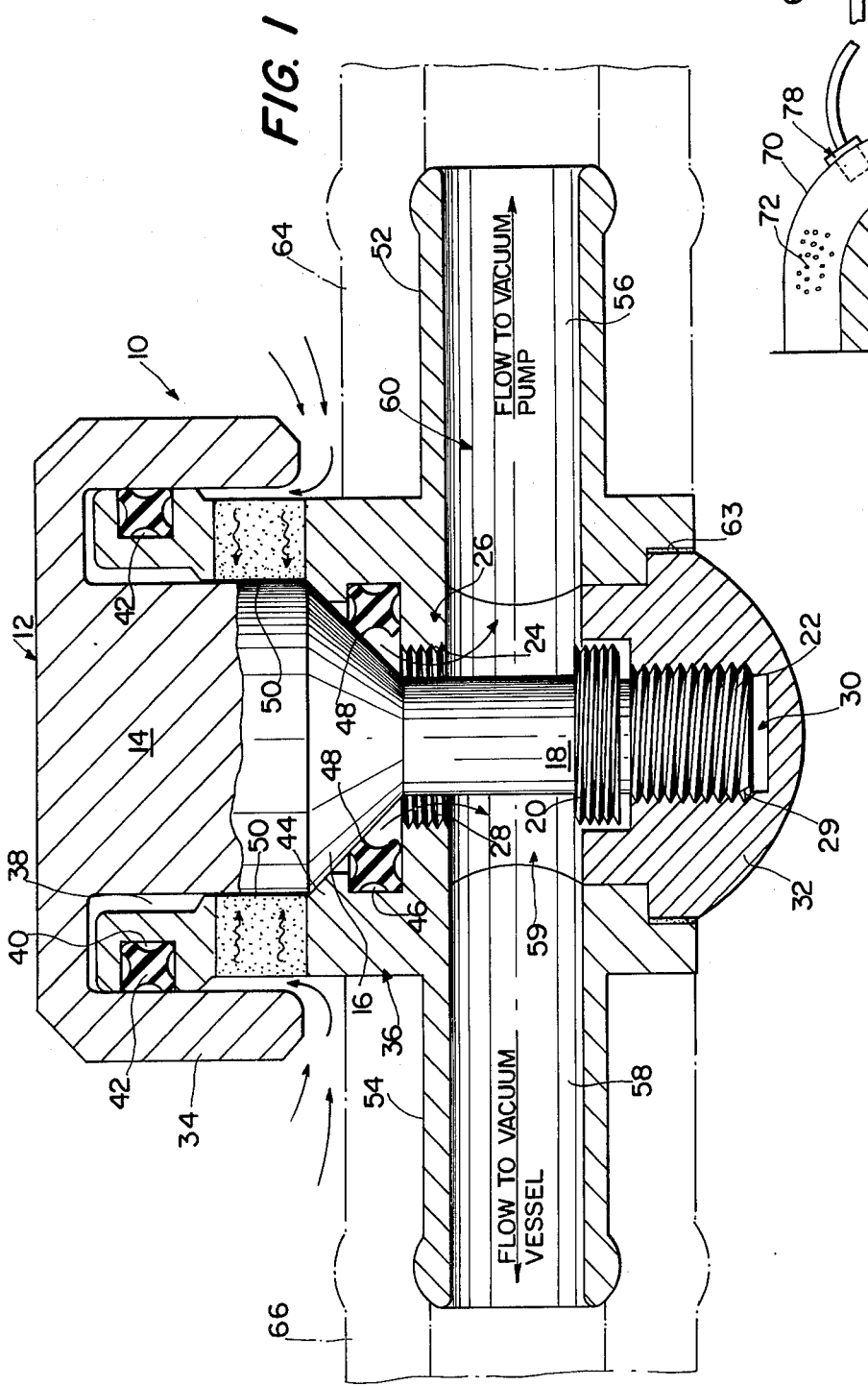
FIG. 1 is a center line cross-sectional view of a preferred embodiment of the control valve of the invention.

Referring to FIG. 1, a center line cross section of a control valve constructed in accordance with the invention is shown. The valve, which is generally denoted 10 and is shown in the closed position thereof, includes a valve body or stem 12 which comprises an upper cylindrical portion 14, a central conical portion 16, and a lower stem portion 18 of smaller diameter than upper cylindrical portion 14. Two sets of screw threads 20 and 22 are formed on lower cylindrical portion 18. The upper thread 20 is typically ¼–40 thread while the lower thread 22 is typically #10–48 thread. Upper thread 20 cooperates with corresponding threading 24 formed on a portion of a valve housing 26 which defines an aperture 28 through which the stem 12 extends. Lower threads 22 engage corresponding threading 29 formed on the walls of a recess 30 in an insert 32 described in more detail below. An annular knurled knob 34 is formed integrally with valve body or stem 12 at the upper end thereof as viewed in FIG. 1.

Housing 26 includes a central annular portion 36 the upper end of which is disposed between the upper cylindrical portion 14 of stem 12 and annular knob 34, and defines a central opening 38 in which stem 12 is received. Annular housing portion 36 includes, at the upper end thereof, an outer circumferential groove 40 therein in which is located a sealing member 42 in the form of a "quad" ring, as illustrated. Sealing member 42 protects the primary seal described below and stabilizes the position of knob 34. An internal shoulder 44 formed on central housing portion 36 presents a conical surface which engages conical portion 16 of stem 12. A further internal, circumferential groove 46, located beneath shoulder 44, houses a further sealing member 48. The latter serves as the primary seal referred to and preferably comprises a further "quad" ring. Sealing member 48 engages the conical portion 16 of stem 12, as illustrated.

A series of four filter members 50 (two of which are shown in the drawings) are disposed in the upper wall of annular housing portion 36 so as to form a discontinuous, circumferentially extending filter. The filter members 50 are typically "Loctite" filters, Model No. 50431, manufactured by Loctite Corporation of Newington, Connecticut. Filters 50 permit air to pass into the valve when the valve is opened and are disposed so that such air must pass therethrough. The filtering effect provided by the porous media of filters 50 is important in that the valve is, in use, likely to be exposed to environments containing particulates such as mud and ashes which could damage the system in which the valve is used, e.g., the vacuum pump described below. As explained hereinbelow, the valve is to be used as part of a rescue system and thus should be operational at all times. The porous media of filters 50 also inhibits the flow of all inlet air thus avoiding the need for a needle valve to obtain sufficient regulation of the air flow.

Housing 26 also includes elongate inlet and outlet portions 52 and 54 which are integral with central housing portion 36. It will be understood that valve 10 is non-directional, i.e., has no polarity, so that the designations "inlet" and "outlet" are somewhat arbitrary as used here. The inlet-outlet portions 52, 54 have central bores 56 and 58 which merge with an orthogonally disposed bore 59 in central housing portion 26. A toroidal passageway is formed around stem portion 18 and the entire air passageway from the valve input to output is collectively denoted 60.

Insert 32 is received in a close-fitting central opening 62 in central housing portion 26. An adhesive/sealant indicated at 63 is used in fixing insert 32 in place. Press-fitting of insert 32 may be used optionally.

It will be appreciated that valve 10 is opened and closed by turning knob 34 which causes corresponding vertical movement of stem 12 either upward or downward so as to control the size of the passage between shoulder 44 and stem 12. With the valve 10 open, air will flow in the direction the arrows through filters 50, past shoulder 44 and through opening 28 into longitudinal passage 60. The actual inlet flow will be affected by (i) the porous media used in fabricating filters 50; (ii) the size of the gap between the stem 12 and shoulder 44; (iii) the position of stem 12 relative to the porous media of filters 50; and (iv) the position of stem 12 in relation to primary sealing member 48.

It will be appreciated that as the stem 12 is retracted from the closed position shown in FIG. 1, the upper cylindrical portion 14, which lies closely adjacent the inner surfaces of filters 50, will translate and during this translation, more of the porous media of filters 50 will be exposed to the gap or open space around the conical portion 16 of stem 12 so that air flow is increased. It will also be seen that the close fitting cylindrical portion 14 provides inhibition of the air flow while conical portion 16, after being unseated from shoulder 44, does not. Thus cylindrical portion 14 can be used in fine regulation of the air flow.

The inlet and outlet portions 52, 54 are adapted to be connected to suitable tubing indicated in dashed lines at 64 and 66 for connection in the system in which the valve is to be used. Thus, referring to FIG. 2, the valve 10 is shown incorporated in a system which is disclosed in copending, concurrently filed, commonly assigned application Ser. No. 057526, entitled SPINE IMMOBILIZATION METHOD AND APPARATUS. The system includes a flexible bladder assembly 70 which is filled with a plurality of spherules, i.e., "beads" or "microballoons", indicated at 72. Ambient pressure on the bladder 70 causes a compaction of the beads 72 contained in the bladder 70 when the internal pressure within bladder 70 is below ambient. The bladder construction becomes rigid because the beads, by design, are disposed to "interlock" rather than roll past each other. The bladder 70 is employed for immobilizing or stabilizing the spine of an accident victim, the torso of the victim being indicated at T in FIG. 2. The bladder 70 is applied to the victim while soft and flexible, and is made rigid so as to conform to the shape of the victim by evacuating some of the air from the bladder 70. This evacuation is accomplished by means of a suction pump 74 which is connected to the bladder 70 by suitable lengths of tubing 64 and 66. A filter 78, disposed in bladder 70 and connected to the proximal end of tubing 66, prevents the exodus of the beads 70 from the bladder 70. A double sealing, "shut-off" type quick disconnect device 80 is used to connect to the suction pump 74 to the bladder 70.

Figure 2:
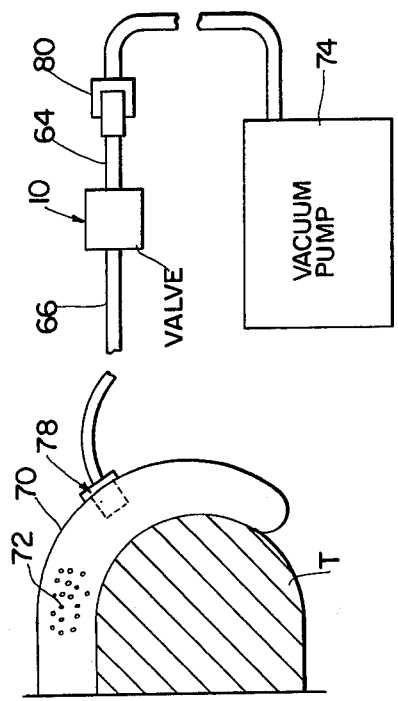
FIG. 2 is a schematic diagram of a spine immobilization system incorporating the valve of the invention.

Valve 10 provides a number of important advantages in the system of FIG. 2. By partially opening the valve, the rate at which the bladder 70 is made rigid can be varied. Further, a bladder 70 which has previously been made rigid can be "softened", even while the pump 74 is still running, so as to permit manual adjustment of the shape of the bladder 70 to the torso of the victim. This latter process can be repeated to enable the required shaping to be effected using a stepwise process wherein the valve is opened slightly, the adjustment in shape is made and the valve is then closed. In this regard, fully "opening" the valve 10 will supply more air than the vacuum pump 74 can remove and, as stated, this permits achieving an "up-to-air" condition, i.e., a fully softened bladder, even when the pump 74 is in operation. Further, when shut-off disconnect device 80 is used to detach the vacuum pump 74 from the bladder 70 so that the bladder 70 can be maintained in the rigid state thereof, valve 10 can be used later to deliberately soften the bladder when the bladder has served its purpose.

As discussed hereinabove, there are a number of further features and advantages of the valve of the invention and these can perhaps be better apreciated now that the basic components of the valve have been considered. For example, it will be seen that valve 10 provides substantially no blockage or inhibition of flow through the vacuum hose to which it is connected. Further, having no polarity, the valve cannot be installed "backwards". In addition, sealing member 42, through the frictional engagement thereof with knob 34, maintains the knob 34 in the desired position. Further, the valve stem 12 is captured within the valve housing 26 through the use of the short sections of thread 20 and 22. Specifically, stem 12 can only be removed by careful manipulation and will not separate accidentally, the lower thread 22 being disengaged before the upper thread can be possibly engaged. When the lower thread is disengaged, the "loose" stem is captured by the interference provided by upper threads 20 and cooperating threads 28, which require that the stem 12 be further unscrewed before release.

An additional feature of the invention which is of considerable importance is the very compact size thereof. In this regard, it is noted that a very short movement or travel of stem 12, approximately 0.11 inch in a specific embodiment, effects a radical change in the inlet flow.

Although the invention has been described with respect to an exemplary embodiment thereof, it will be understood that variations and modifications can be effected in the embodiment without departing from the scope or spirit of the invention.

We claim:

1. A control valve adapted to be connected between a vessel and a vacuum pump for controlling the pressure on the vessel, said valve comprising a housing having a bore extending therethrough the ends of which are adapted for connection to the vessel and vacuum pump, respectively, an air inlet in said housing, filter means disposed in said air inlet for filtering air flowing through said air inlet; a valve body mounted for movement within said housing between a first, closed position wherein air flow through said air inlet and said filter means to said bore is blocked and a second, at least partially open position wherein at least some air flow through said air inlet and said filter means to said bore is provided, said valve body being mounted for movement orthogonal to said bore, said valve further including primary sealing means for preventing air flow to said bore when said valve body is in the closed position thereof, said valve body and said housing including conical mating surfaces which are brought into engagement when said valve body is in the closed position thereof, said conical surfaces disengaging during movement of said valve body away from the closed position thereof to provide a passage for air therebetween, said valve body also comprising a cylindrical surface which is disposed adjacent to said filtering means and which exposes an increasing amount of said filtering means to said passage between said conical surfaces during movement of said valve body away from the closed position thereof;

a control member for controlling said movement of said valve body, said housing including a first threaded portion which engages a first threaded portion of said valve body, said control member comprising a rotatable control knob which, when rotated, causes translation of said valve body through the interaction of the respective portions;

said valve body including a cylindrical portion located on the other side of said conical surface from the cylindrical surface and a second threaded portion of said valve body being formed on said cylindrical portion between said conical surface and said first threaded portion, a second threaded portion of said housing being formed in a portion of said housing located on the other side of said bore from said first threaded portion wherein said valve body including said second threaded portion is normally disengaged from the second threaded portion of said valve housing and which permits removal of said valve body from said housing only through unscrewing of said valve body from said housing through the interaction of the respective second threaded portions.

2. A control valve as claimed in claim 1 further comprising further sealing means disposed on a groove formed in a portion of said housing which lies adjacent to the cylindrical surface of said valve member for engaging an inner surface of said control knob so as to assist in fixing the position of said knob.

3. A control valve as claimed in claim 2 wherein the first threaded portion of said housing is formed on a removable insert which is disposed in an opening in housing.

* * * * *